No. 792,883. PATENTED JUNE 20, 1905.
W. T. DONNELLY.
HEAT TRANSFERRING APPARATUS.
APPLICATION FILED JUNE 6, 1904.
3 SHEETS—SHEET 1.
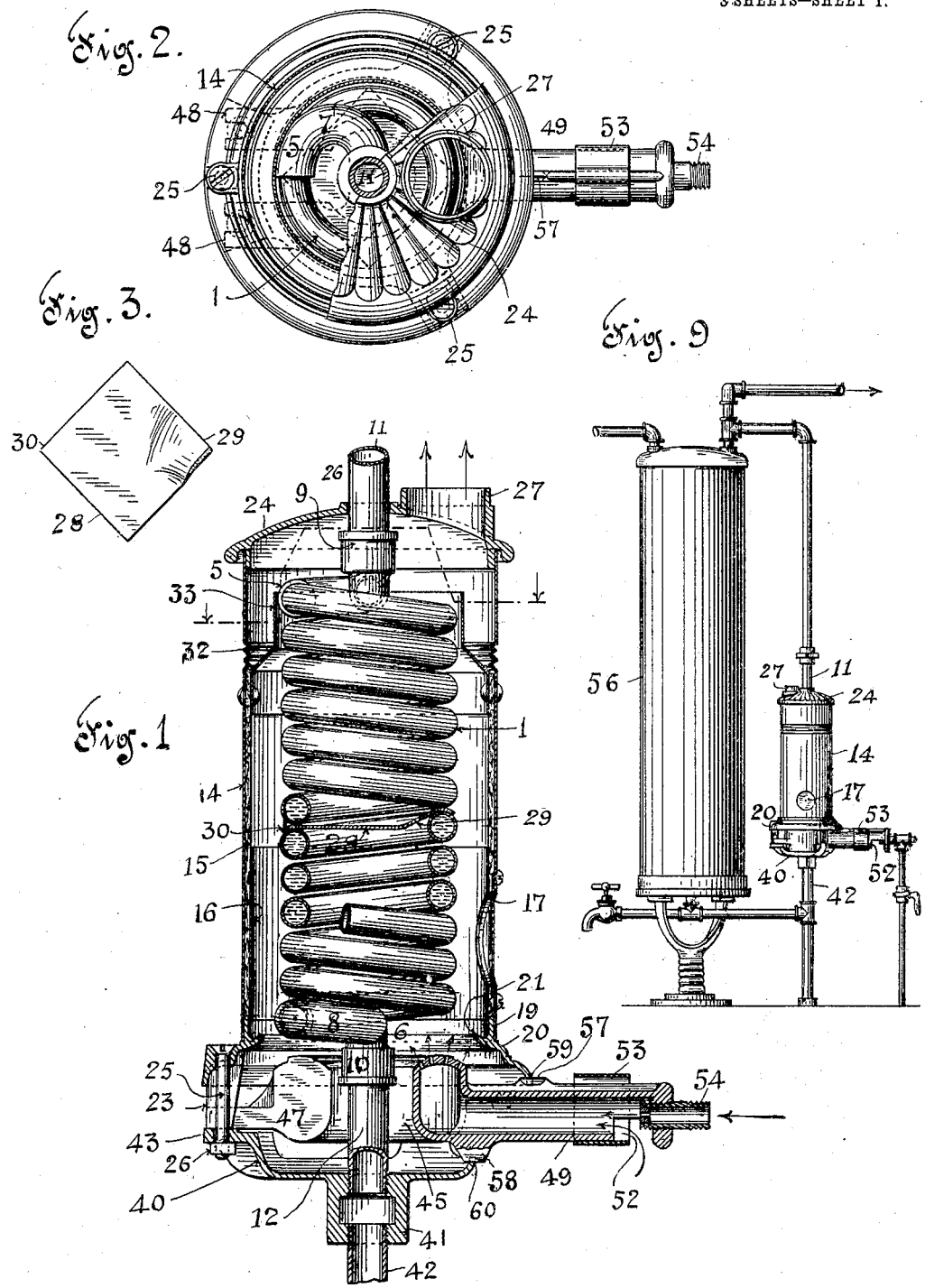

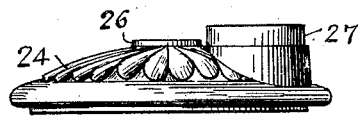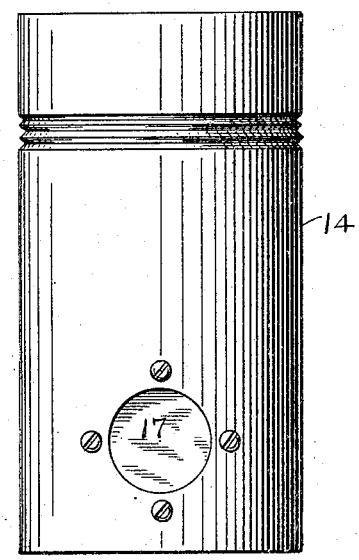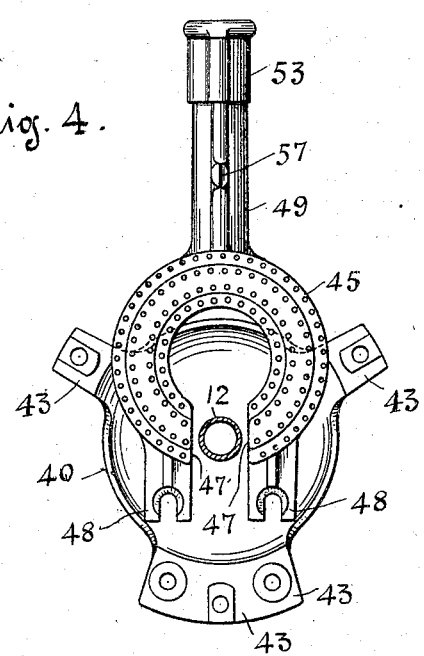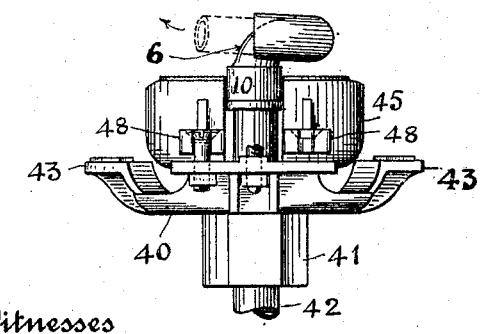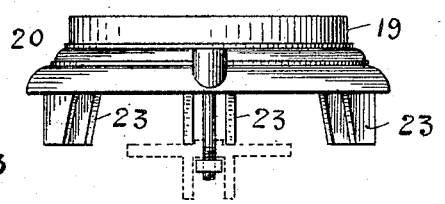

No. 792,883. PATENTED JUNE 20, 1905.
W. T. DONNELLY.
HEAT TRANSFERRING APPARATUS.
APPLICATION FILED JUNE 6, 1904.
3 SHEETS—SHEET 3.
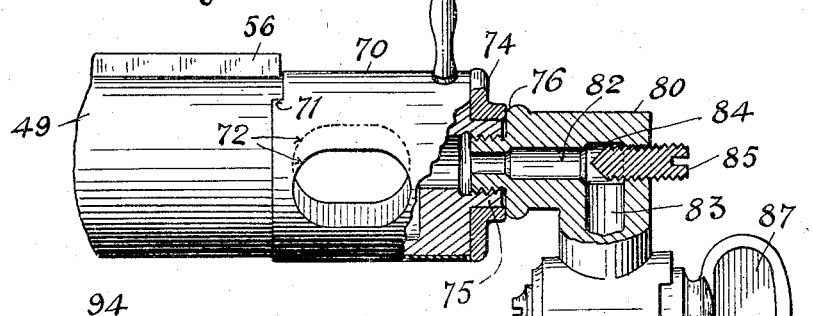
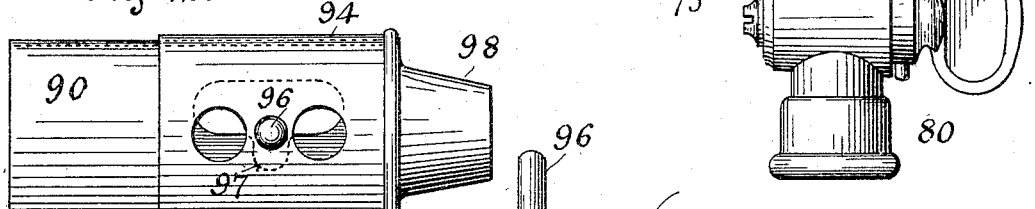
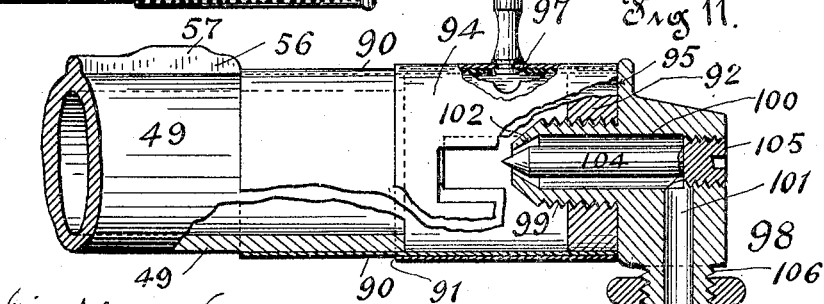
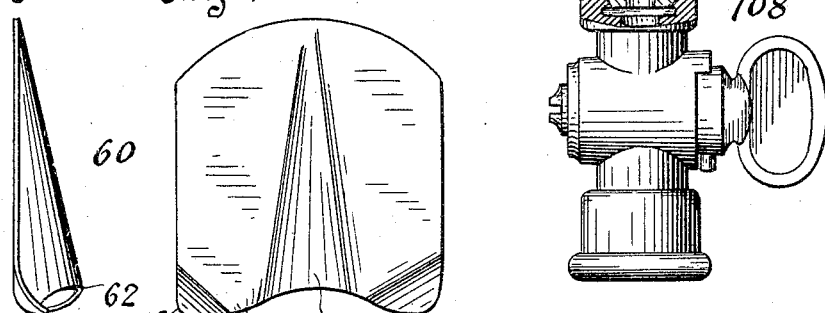
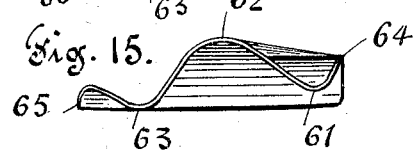
Witnesses
Frederick Snow Kellogg
Henry W. Brown
Inventor
William T. Donnelly
By his Attorney
S. Walter Brown No. 792,883. Patented June 20, 1905.

UNITED STATES PATENT OFFICE.

WILLIAM T. DONNELLY, OF FLATBUSH, NEW YORK, ASSIGNOR TO GENERAL GAS APPLIANCE COMPANY, OF NEW YORK, N. Y., A CORPORATION OF NEW JERSEY.

HEAT-TRANSFERRING APPARATUS.

SPECIFICATION forming part of Letters Patent No. 792,883, dated June 20, 1905.

Application filed June 6, 1904. Serial No. 211,415.

*To all whom it may concern:*

Be it known that I, WILLIAM T. DONNELLY, a citizen of the United States of America, and a resident of Flatbush, in the borough of Brooklyn, city of New York, State of New York, have invented certain new and useful Improvements in Heat-Transferring Apparatus, of which the following is a specification.

This invention relates to improvements in heat-transferring apparatus of that class wherein the heat is absorbed from a suitable source by a column of heat-absorbing fluid flowing through a conduit which is exposed to the heat. Such apparatus are used for many purposes, and I show in the accompanying drawings and describe in the specification hereinafter that form which consists of a gas water-heater wherein the source of heat is a gas-flame and the heat-absorbing fluid is water contained in a heating-coil.

The invention aims to provide apparatus of high heating efficiency by attaining as nearly perfect combustion as possible and by bringing and keeping the hot products of combustion into the closest possible contact with the surface of the coil throughout its whole extent, and by so proportioning and arranging the apparatus to effect these results it also obviates the formation of the odorous gaseous products which are very objectionable in gas water-heating apparatus.

It is also an object of this invention to so proportion, shape, and combine the parts of which the heater is composed that it can be very readily assembled and set up and taken apart for cleaning and repair and that the cast-metal parts will be practically ready for assembling as they come from the mold without requiring any expensive finishing.

Referring to the drawings which accompany the specification to aid the description, Figure 1 is a broken vertical section and elevation of apparatus arranged with a gas heating-burner. Fig. 2 is a top view thereof with the casing partly broken away. Fig. 3 is a plan of a baffle. Fig. 4 is a plan of the burner and showing the same partly inserted to place on the bottom plate. Fig. 5 is a rear elevation of the burner and bottom plate. Fig. 6 is an elevation of the casing-base, and Figs. 7 and 8 are respectively an elevation of the casing and cap. Fig. 9 is an elevation, on smaller scale, of a heater connected to a kitchen-boiler. Figs. 10 and 11 are broken sectional elevations of two several modifications of gas-cocks provided with gas-regulating valves, and Fig. 12 is a plan of the air-shutter. Figs. 13, 14, and 15 are respectively a plan, an edge, and a front view of the preferred form of baffle.

The conduit 1 for a heat-absorbing fluid, as water, is preferably a copper coil having its spirals sufficiently open to permit of the free passage of the hot products of combustion and provided at its extremities with cast bends 5 6, brazed on. Each said bend is curved inwardly at 7 8, respectively, to the center of the coil and then axially, forming hubs 9 10, which are threaded for connection with pipes 11 12. This construction, which provides hubs at the axis of the coil for connection with inlet and outlet pipes, is a valuable improvement, greatly facilitating the assembling of the parts of the apparatus and their connection with the said pipes. Said coil 1 is arranged in a casing 14 of greater diameter, so as to leave proper space for products of combustion between the coil and the casing, and said casing is preferably lined with some non-conductor of heat, as asbestos cloth, 15, held between the outer sheet metal of said casing and an inner lining 16, 17 being an inspection-orifice through the outer and inner metal and the asbestos lining, closed by a mica plate in the well-known manner. At its lower end said casing 14 is fitted on a cast base 20, provided with an aperture 21, of somewhat greater diameter than the said coil 1. Said base 20 is provided with distance-lugs 23, arranged in pairs at each side of the holes for the bolts 25, which secure the bottom plate 40 to said base. At its upper end said casing 14 is fitted with a cast-metal cap 24, having a central hub 26 for insertion of said outlet-pipe 11 and a sleeve 27 for a chimney connection. Intermediate the ends of said coil 1 is an internal baffle 28, which may be of the shape shown in Fig. 3 and which is held in place by the corners (or lugs) 29 30, which are bent over a spiral of said coil, and said baffle may be brought to the proper place in the coil by inserting the said corners 29 30 between the spirals of said coil 1 before the bends 6 6 are put on and revolving said baffle 28, whereby said baffle is screwed to its place in the coil; but said baffle is preferably cast in the shape shown in Figs. 13, 14, and 15, wherein, as shown in the front view, Fig. 15, the baffle 60 is so curved at 61 62 63 as to conform to the curves of a spiral of the coil 1 and the corners 64 65 are curved to fit over the spiral. With this shape by inserting the baffle into one end of the said coil 1 before the bend 5 or 6 is brazed on the baffle may be readily screwed to any desired place in the coil and will be securely held in position merely by its shape. At the upper end of said coil 1 is a baffle or deflector 32, shaped as a hood and having a close fit around the upper end of said coil 1. Thus said deflector 32 constitutes an external baffle to direct the products of combustion inwardly through the spirals of coil 1, said products of combustion then ascending through the interior of the coil on their way to the chimney. With long coils there may be more than one pair of baffles and arranged so as to deflect the hot products of combustion alternately outwardly and inwardly through the said slits between the spirals of said coil and in close contact therewith, whereby the greatest amount of heat will be given up to the fluid in the coil 1. A gas-burner 45 is situated below said coil 1 in the space between said base 20 and said bottom plate 40, said spacing-lugs 23 being of proper length to form a chamber for the said burner. Said burner 45 is preferably of horseshoe shape in plan and slightly crowned, the crown being provided with numerous small gas-escape orifices and the diameter across the top of the burner being approximately the same as the external diameter of coil 1, the clear opening within the horseshoe being of slightly less diameter than the clear opening within the coil. The ends of the horseshoe are sufficiently separated at 47 to permit of the ready insertion and removal of the burner past pipe 12, and slotted lugs 48 provide for conveniently holding the burner in proper position to said plate 40. Said burner 45 is provided with inlet and mixing tube 49, preferably cast integral with the body of the burner, and is provided with the Bunsen air-inlet 52 and the air-regulating sleeve 53, which slides on said tube 49. A reducing gas-nozzle 54 is threaded into the end of tube 49, being also threaded on its outer end for connection with a gas-supply pipe. Said burner 45 is securely held in position by being bolted, as aforesaid, to the bottom plate 40 and by the ribs 57 58 on the tube 49, respectively, engaging in nicks 59 60 in said base 20 and plate 40. Said sleeve 53 being adjustable can be used to close the air-inlet 52 just before the gas is ignited and before it is shut off, thereby preventing flashing back. After the burner is lighted the sleeve will open the proper amount to obtain perfect combustion. Said bottom plate 40 is dished, as shown, to form a drip-pan to catch the water which condenses in the apparatus. Said plate 40 is provided with a threaded boss 41 for connection with said pipe 12 and also with a supply-pipe, as 42, Fig. 9, and for convenience in properly positioning said plate 40 it is provided at situations registering with said spacing-lugs 23 with radial lugs 43 43, slightly recessed at the top edges so as to form surfaces and shoulders to fit between the ends of each pair of spacing-lugs, the under side of said lugs being ribbed to provide recesses for the nuts 26. By this construction the base, burner, and bottom plate may all be cast and require no further finish to fit together, and the bolts 25 and the nuts 26 are protected from the destructive action of the flame, while the casing 14 and base 20 are readily raised from the bottom plate 40 by merely unscrewing said bolts 25, thereby giving easy access to the burner 45 for cleaning the same. Should it be necessary to remove the burner, this can be done by slacking the nuts on the bolts which secure said lugs to said bottom plate.

In assembling the parts the baffle 28, having been put in the coil 1 and the pipes 11 12, respectively, screwed into the bends 5 6, the bottom plate 40 is threaded on the end of said pipe 12 and the burner 45 bolted on said plate 40 and the casing 14, with its deflector 32, base 20, and cap 24 all in place, slipped down over pipe 11 and coil 1, the casing being turned to bring the distance-lugs 23 to place on the radial lugs of the bottom plate 40. The bolts 25 are then inserted in the holes in base 20 and turned home in the nuts 26, and the apparatus is completely assembled and ready for connection with gas and water pipes when it is to be set up.

When the apparatus is used to heat water in a kitchen-boiler, the pipes 11 and 42 will be respectively connected by suitable pipes, bends, and joints with a top and bottom pipe of said boiler 56, whereby a constant circulation of water will be maintained through the coil and the boiler.

Referring to Fig. 10, the smooth buffed end of said tube 49, which is plain and without a shoulder, is fitted with a rotatable air-shutter 70, positioned between the rib 56 and the washer 74, fitted loosely against the end of said tube 49 on the neck 75 thereof. Said washer 74 is held in place by the shoulder 76 of the cock 80, which threads into the end of said tube 49. Said cock 80 is provided with the through-bore 82, preferably reduced at its inner part, as shown, and the bore 83 is controlled by the main gas-plug 87, said bores 82, 83, intersecting at substantially a right angle and forming a seat 84, into which works the conical gas-check 85, threaded into the outer end of said bore 82 and having a slotted outer end to be turned by a screw-driver. Thus with the construction shown the air-shutter 70 can be readily slipped over the end of the tube 49, the washer 74 put on, and the cock 80 threaded home and turned to any direction to make connection with a gas-pipe, and the parts can be as readily separated for any purpose, while the gas-supply can be regulated by the check to suit any condition of quality or pressure of the gas.

Referring to Figs. 11 and 12, the tube 49 is cut short, as at 91, and a smooth sheet-metal sleeve 90, preferably of brass, is fixed thereon, being closed at the outer end by a threaded plug 92. Said sleeve 90 is suitably ported, and upon it is fitted a rotatable air-shutter 94, provided with air-ports to register when open with the ports in said sleeve 90. The rotation of said shutter 94 is suitably limited by the inner end of stud 96 engaging in a slot 97 in said sleeve 90. Through the said plug 92 threads the long neck 99 of a ported plug 98, the bores 100 101 whereof intersect substantially at a right angle, the flanged face 95 of said plug aiding in holding said shutter in position on said sleeve. At its inner end said bore 100 tapers, as shown, forming a conical seat to which works the needle-valve 104, which threads into said bore 100 and is provided with a slotted head 105 to be turned by a screw-driver. Around the outer end of said bore 101 said plug 98 is provided with a threaded end 106 to fit any standard gas-cock 108. By the construction described the heater equipped at the shop with the plug 98 will be ready to connect with any standard gas-cock as occasion renders desirable, and the parts may be readily assembled and separated as occasion renders necessary, while the position of the needle-valve 104 is such as to promote the greatest indraft of air and most effective mixture of air and gas.

Now, having described my improvements, I claim as my invention—

1. In heat-transferring apparatus, the combination of a coil for heat-absorbing fluid, a casing therefor, a separable bottom plate apertured for the end of the coil and provided with seats for spacing-lugs, and spacing-lugs and bolts adapted to position the said plate the proper distance below the shell, substantially as described.

2. In heat-transferring apparatus, the combination with a casing, burner and coil, of a base provided with spacing-lugs positioned to receive a bolt between the lugs, and a separable bottom plate provided with lugs registering with the ends of the first-named lugs and with recesses for nuts of securing-bolts, substantially as described.

3. In heat-transferring apparatus, the combination with the base 20 and the bottom plate 40 of a gas-burner 25 provided with lugs adapted to be bolted to the bottom plate and with surfaces adapted to fit recesses in said base and bottom plate, substantially as described.

4. In heat-transferring apparatus, the combination with a coil of a baffle shaped to conform substantially to the curvature of the coil and adapted to be screwed to place in the coil, substantially as described.

5. In heat-transferring apparatus, the combination with a coil of an adjustable baffle provided with means for connection with the coil and adapted to be screwed to place, substantially as described.

6. In heat-transferring apparatus, the combination with a coil of an adjustable baffle having lugs conformed to the spiral shape of the coil and fitting thereon, substantially as described.

Signed at New York city this 2d day of June, 1904.

WILLIAM T. DONNELLY.

Witnesses:
D. WALTER BROWN,
HENRY V. BROWN.